United States Patent
Makino et al.

(10) Patent No.: US 11,050,324 B2
(45) Date of Patent: Jun. 29, 2021

(54) MOTOR

(71) Applicant: Nidec Corporation, Kyoto (JP)

(72) Inventors: Yusuke Makino, Kyoto (JP); Satoshi Kajikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 414 days.

(21) Appl. No.: 16/053,846

(22) Filed: Aug. 3, 2018

(65) Prior Publication Data

US 2019/0052150 A1 Feb. 14, 2019

(30) Foreign Application Priority Data

Aug. 10, 2017 (JP) .............................. JP2017-155391

(51) Int. Cl.
*H02K 9/06* (2006.01)
*H02K 5/10* (2006.01)
(Continued)

(52) U.S. Cl.
CPC .............. *H02K 9/06* (2013.01); *H02K 1/278* (2013.01); *H02K 1/2773* (2013.01); *H02K 1/28* (2013.01); *H02K 5/10* (2013.01); *H02K 5/16* (2013.01); *H02K 5/161* (2013.01); *H02K 5/1735* (2013.01); *H02K 5/20* (2013.01); *H02K 5/225* (2013.01); *H02K 7/08* (2013.01); *H02K 7/083* (2013.01); *H02K 7/085* (2013.01); *H02K 7/088* (2013.01); *H02K 15/14* (2013.01); *H02K 15/165* (2013.01); *H01R 25/16* (2013.01); *H02K 2201/06* (2013.01)

(58) Field of Classification Search
CPC .... H02K 1/2766; H02K 1/276; H02K 1/2706; H02K 9/06; H02K 1/2773; H02K 1/278; H02K 1/28; H02K 5/10; H02K 5/16; H02K 5/161; H02K 5/1735; H02K 5/20; H02K 5/225; H02K 7/08; H02K 7/083; H02K 7/088; H02K 15/14; H02K 15/165; H02K 2201/06; H01R 25/16
USPC .................................. 310/12.29, 58, 62, 63
See application file for complete search history.

(56) References Cited

U.S. PATENT DOCUMENTS

2015/0028710 A1 1/2015 Oka et al.
2016/0241098 A1 8/2016 Fukunaga

FOREIGN PATENT DOCUMENTS

CN 1290420 A 4/2001
CN 103580325 A 2/2014
(Continued)

OTHER PUBLICATIONS

Makino et. al.; "Rotor Assembly And Motor Including The Same"; U.S. Appl. No. 16/053,844, filed Aug. 3, 2018.
(Continued)

*Primary Examiner* — Terrance L Kenerly
(74) *Attorney, Agent, or Firm* — Keating & Bennett

(57) ABSTRACT

A motor includes a shaft with a central axis along an up and down direction as a center, a bearing mechanism rotatably supporting the shaft; a cylindrical rotor main body fixed to the shaft; a rotor fan fixed to the shaft at an upper side of the rotor main body; an armature facing the rotor main body in a radial direction; and a housing accommodating the rotor main body, the rotor fan, and the armature therein. The bearing mechanism includes a first bearing above the rotor fan in the housing and facing the rotor fan in the up and down direction and a second bearing positioned below the rotor main body. The housing includes a first opening, a second opening, and a bearing holding portion.

10 Claims, 11 Drawing Sheets

(51) Int. Cl.
*H02K 5/173* (2006.01)
*H02K 7/08* (2006.01)
*H02K 5/20* (2006.01)
*H02K 15/14* (2006.01)
*H02K 15/16* (2006.01)
*H02K 1/27* (2006.01)
*H02K 1/28* (2006.01)
*H02K 5/16* (2006.01)
*H02K 5/22* (2006.01)
*H01R 25/16* (2006.01)

(56) References Cited

FOREIGN PATENT DOCUMENTS

| | | |
|---|---|---|
| CN | 104335454 A | 2/2015 |
| CN | 105432002 A | 3/2016 |
| CN | 105932800 A | 9/2016 |
| JP | 2016-101008 A | 5/2016 |

OTHER PUBLICATIONS

Makino et. al.; "Motor"; U.S. Appl. No. 16/055,208, filed Aug. 6, 2018.
Makino et. al.; "Motor"; U.S. Appl. No. 16/059,083, filed Aug. 9, 2018.
Makino et. al.; "Rotor Assembly, Motor Including Rotor Assembly, And Method For Manufacturing Rotor Assembly"; U.S. Appl. No. 16/059,085, filed Aug. 9, 2018.
Official Communication issued in corresponding Chinese Patent Application No. 201810768707.5, dated Sep. 10, 2020.

MOTOR

CROSS REFERENCE TO RELATED APPLICATIONS

This application claims the benefit of priority to Japanese Patent Application No. 2017-155391 filed on Aug. 10, 2017. The entire contents of this application are hereby incorporated herein by reference.

BACKGROUND OF THE INVENTION

1. Field of the Invention

The present disclosure relates to a motor.

2. Description of the Related Art

In the related art, there is known a technique for providing a cooling fan in a housing of a motor to cool an inside of the housing. In the rotating electric machine, a cooling fan rotates integrally with the rotation of a rotation shaft. The cooling fan includes a disk-shaped main plate having a diameter approximately equal to an inner diameter of a motor housing and a plurality of blades provided on the outer peripheral portion of the main plate.

The air taken into the motor housing from an air inlet port by the rotation of the cooling fan flows toward an outer peripheral side of the cooling fan along a main surface on one side of the main plate. The air flowing to the outer peripheral side flows over an outer peripheral edge portion of the main plate and flows into space on the other side of the main plate. Then, the air is blown to a stator core and a rotor core.

Incidentally, in the rotating electric machine, since an air flow path in the motor housing is complicated and the air current diffuses, there is a limit to increase a flow rate of the air flow. Therefore, it is difficult to efficiently cool the inside of the motor housing of the rotating electric machine.

SUMMARY OF THE INVENTION

A preferred embodiment of the present disclosure provides a motor including: a shaft which has a central axis along an up and down direction as a center; a bearing mechanism which rotatably supports the shaft; a cylindrical rotor main body which is fixed to the shaft; a rotor fan which is fixed to the shaft at an upper side of the rotor main body; an armature which faces the rotor main body in a radial direction; and a housing which accommodates the rotor main body, the rotor fan, and the armature therein. The bearing mechanism includes a first bearing which is positioned above the rotor fan in the housing and faces the rotor fan in the up and down direction and a second bearing which is positioned below the rotor main body. The housing includes a first opening which is positioned above the armature, a second opening which is positioned below the armature, and a bearing holding portion which holds the first bearing by coming in contact with an outer surface of the first bearing. An outer surface of the bearing holding portion faces inward in the radial direction as the outer surface goes downward.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Figure 1:
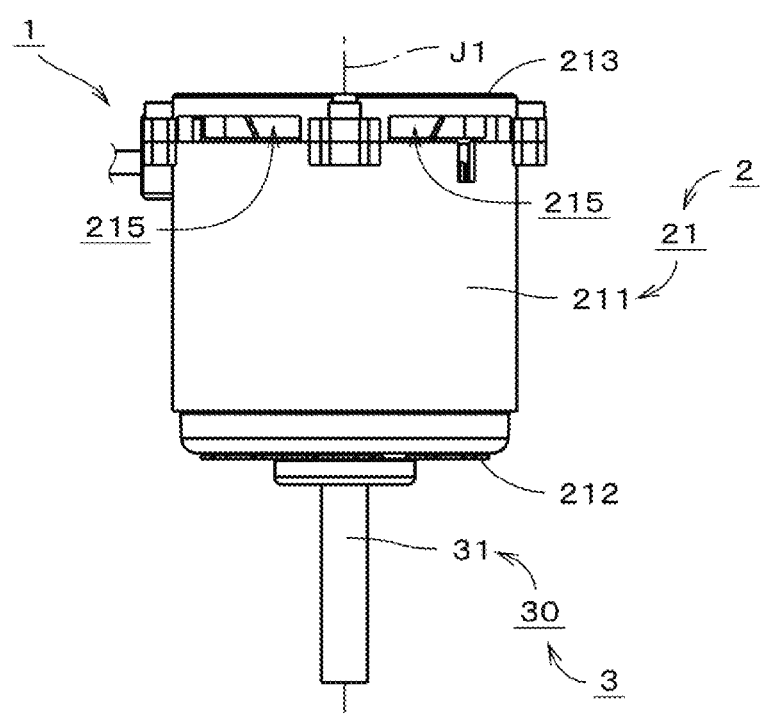
FIG. 1 is a side view illustrating a motor according to a preferred embodiment of the present invention.
Figure 2:
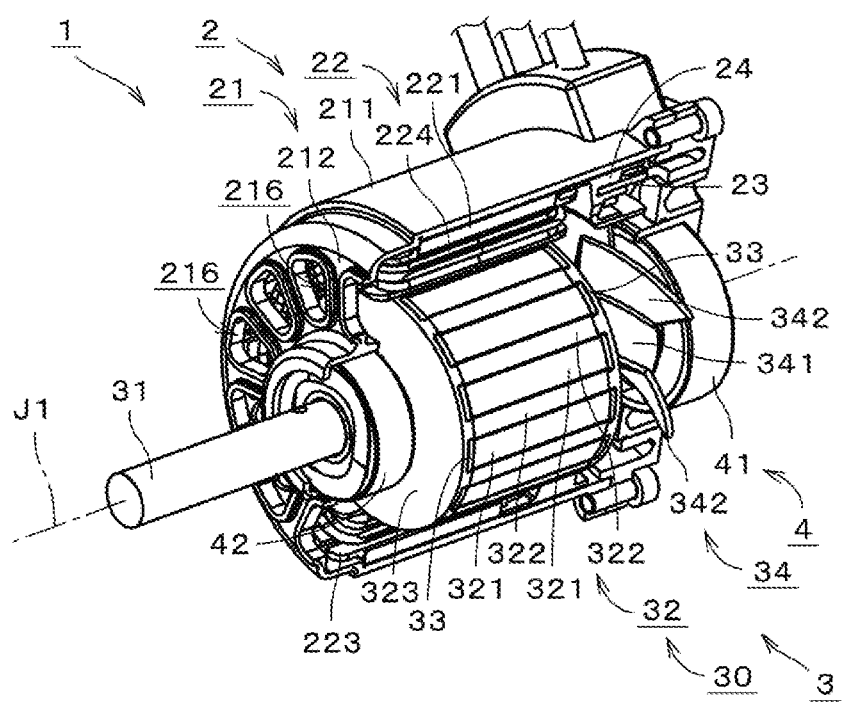
FIG. 2 is a perspective view illustrating an internal structure of a motor according to a preferred embodiment of the present invention.
Figure 3:
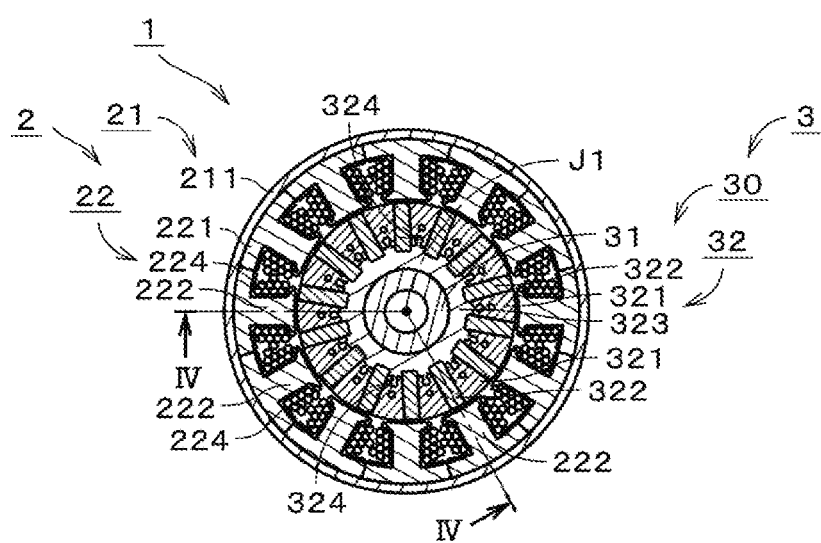
FIG. 3 is a transverse sectional view illustrating a motor according to a preferred embodiment of the present invention.
Figure 4:
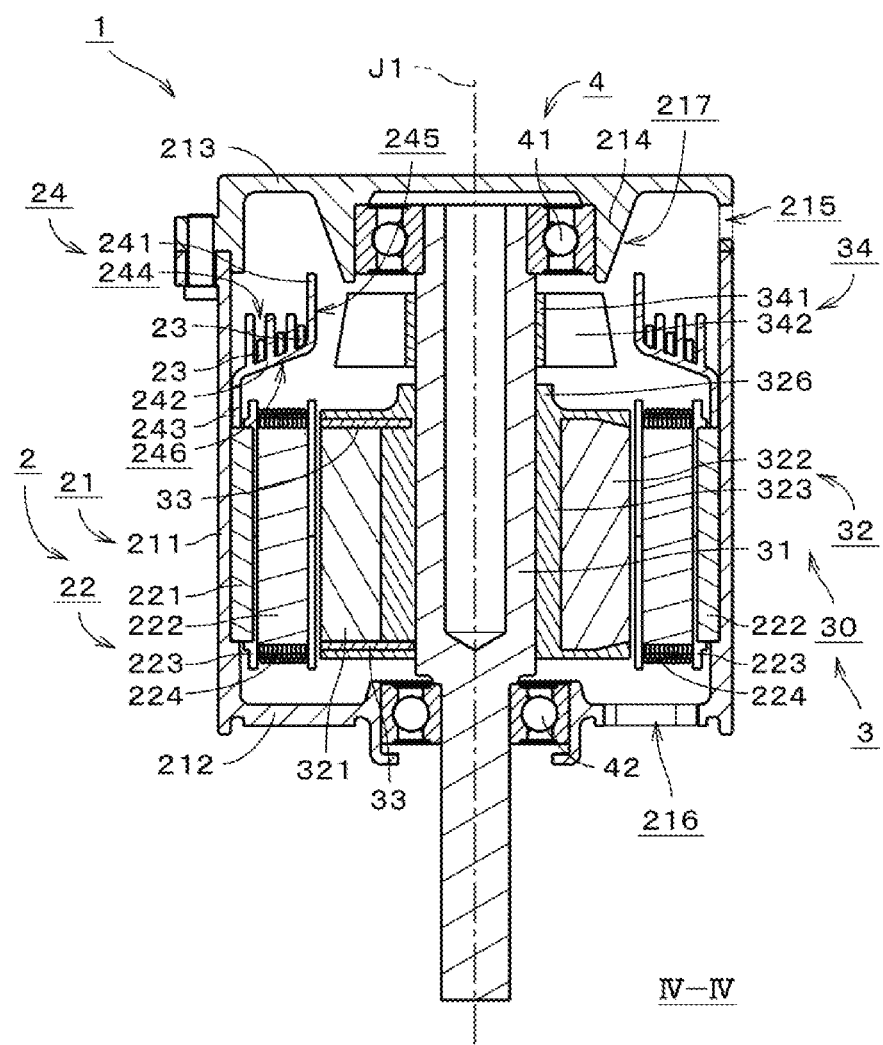
FIG. 4 is a longitudinal sectional view illustrating a motor according to a preferred embodiment of the present invention.

FIG. 1 is a side view illustrating an outer appearance of a motor 1 according to a preferred embodiment of the present invention. The motor 1 is an inner rotor type brushless motor. The motor 1 is used, for example, to rotate an impeller in an axial flow fan. FIG. 2 is a perspective view illustrating an internal structure of the motor 1. In FIG. 2, a portion of the housing 21 or the like of the motor 1 is omitted for illustration. FIG. 3 is a transverse sectional view of the motor 1. FIG. 4 is a longitudinal sectional view of the motor 1 cut at position IV-IV in FIG. 3. In FIG. 3 and FIG. 4, parallel slanted lines in the detailed cross section are omitted.

In this specification, an upper side in a direction of a central axis J1 of the motor 1 in FIG. 4 is simply referred to as "upper side", and a lower side is simply referred to as "lower side". The upper side and the lower side in this specification do not indicate the upper side and the lower side in the direction of gravity when incorporated in actual equipment.

In the following description, a circumferential direction which has the central axis J1 as a center is simply referred to as "circumferential direction", and the radial direction which has the central axis J1 as a center is simply referred to as "radial direction". In addition, the direction parallel to the central axis J1 is referred to as "up and down direction". The up and down direction is also an axial direction.

The motor 1 includes a stationary portion 2, a rotation portion 3, and a bearing mechanism 4. The bearing mechanism 4 rotatably supports the rotation portion 3 with respect to the stationary portion 2. The stationary portion 2 includes a housing 21, an armature 22, a bus bar 23, and a bus bar holding portion 24. The rotation portion 3 includes a rotor assembly 30 and a rotor fan 34. The rotor assembly 30 includes a shaft 31, a rotor main body 32, and a connection plate portion 33. The bearing mechanism 4 includes a first bearing 41 and a second bearing 42. The first bearing 41 and the second bearing 42 are, for example, ball bearings.

The housing 21 is a substantially cylindrical member having a bottom and a lid, which has the central axis J1 along the up and down direction as a center. The housing 21 includes a side wall portion 211, a bottom portion 212, and a canopy portion 213. The side wall portion 211 is a substantially cylindrical portion which has the central axis J1 as a center. The bottom portion 212 is a substantially annular plate-shaped portion which has the central axis J1 as a center. The bottom portion 212 is connected to the lower end portion of the side wall portion 211 and covers a lower opening of the side wall portion 211. The canopy portion 213 is a substantially disk-like portion which has the central axis J1 as a center. The canopy portion 213 is connected to an upper end portion of the side wall portion 211 and covers the upper opening of the side wall portion 211.

In the housing 21, a plurality of first openings 215 are provided in an upper portion of the side wall portion 211. In an example illustrated in FIG. 1, four first openings 215 are positioned on the outer surface of the housing 21. The plurality of first openings 215 are arranged at substantially equal angular intervals in the circumferential direction at substantially the same position in the up and down direction. The plurality of first openings 215 are positioned above the armature 22. Each first opening 215 is a through hole penetrating the side wall portion 211 in the radial direction. Each of the first openings 215 is a substantially rectangular shape extending in the circumferential direction in a side view. The shape of the first opening 215 may be appropriately changed. The number of the first openings 215 may be 1, or 2 or more.

In addition, in the housing 21, a plurality of second openings 216 are provided in the outer peripheral portion of the bottom portion 212. The plurality of second openings 216 are positioned below the armature 22. The plurality of second openings 216 are arranged at substantially equal angular intervals in the circumferential direction at substantially the same position in the radial direction. Each second opening 216 is a through hole penetrating the bottom portion 212 in the up and down direction. Each of the second openings 216 is a substantially rectangular shape in a plan view. The shape of the second opening 216 may be appropriately changed. The number of the second openings 216 may be 1, or 2 or more. In an example illustrated in FIG. 2, twelve second openings 216 which are equal in number to the teeth 222 (described below) of the armature 22 are positioned between the plurality of teeth 222 in the circumferential direction in the bottom surface of the housing 21.

The upper portion of the shaft 31, the rotor main body 32, the rotor fan 34, the armature 22, the bus bar 23, and the bus bar holding portion 24 are accommodated in the housing 21. The lower end portion of the shaft 31 protrudes downward from the bottom portion 212 of the housing 21. At the lower end portion of the shaft 31, for example, the impeller of an axial flow fan is attached.

The shaft 31 is a substantially columnar or substantially cylindrical member which has the central axis J1 as a center. In an example illustrated in FIG. 4, the shaft 31 is a substantially cylindrical member. Accordingly, it is possible to reduce the weight of the shaft 31 and the motor 1. The shaft 31 is, for example, a member made of a non-magnetic material. The shaft 31 is formed of, for example, stainless steel. The shaft 31 is rotatably supported by the bearing mechanism 4.

The first bearing 41 of the bearing mechanism 4 rotatably supports the upper end portion of the shaft 31 at the upper end portion in the housing 21. The first bearing 41 is a substantially cylindrical member which has the central axis J1 as a center. In the example illustrated in FIG. 4, the first bearing 41 is held by a bearing holding portion 214 of the housing 21. The bearing holding portion 214 is a substantially cylindrical portion protruding downward from the canopy portion 213 of the housing 21 toward the inside of the housing 21. The bearing holding portion 214 is in contact with the outer surface of the first bearing 41 and holds the first bearing 41.

The second bearing 42 of the bearing mechanism 4 is positioned below the first bearing 41 and rotatably supports the lower portion of the shaft 31. The second bearing 42 is positioned, for example, below the rotor main body 32. The second bearing 42 is a substantially cylindrical member which has the central axis J1 as a center. The outer diameter of the second bearing 42 is, for example, smaller than the outer diameter of the first bearing 41. In the example illustrated in FIG. 4, the second bearing 42 is positioned substantially at the same position as the bottom portion 212 of the housing 21 in the up and down direction. The second bearing 42 is held by the bottom portion 212 of the housing 21.

The rotor main body 32 is a substantially cylindrical member which has the central axis J1 as a center. The rotor main body 32 is fixed to the outer surface of the shaft 31. The rotor main body 32 is fixed to the shaft 31 by insert molding, for example. At both ends of the rotor main body 32 in the up and down direction, a substantially annular plate-like connection plate portion 33 is disposed. The rotor main body 32 is also connected to the shaft 31 by the connection plate portion 33. The connection plate portion 33 may be provided only at one of the upper end portion and the lower end portion of the rotor main body 32.

The rotor main body 32 includes a plurality of core pieces 321, a plurality of rotor magnets 322, and a connection portion 323. The plurality of core pieces 321 are made of magnetic metal. Each core piece 321 is formed by stacking in the up and down direction and caulking a plate member made of a magnetic metal such as a steel plate. The connection portion 323 is made of resin.

The plurality of core pieces 321 are arranged around the shaft 31 in the circumferential direction. The plurality of rotor magnets 322 are arranged alternately with the plurality of core pieces 321 around the shaft 31 in the circumferential direction. The plurality of core pieces 321 are disposed at substantially equal angular intervals. The plurality of rotor magnets 322 are also arranged at substantially equal angular intervals. In an example illustrated in FIG. 3, fourteen core pieces 321 and fourteen rotor magnets 322 are alternately arranged in the circumferential direction.

In the plan view, each core piece 321 is a portion of the substantially annular shape in the circumferential direction which has the central axis J1 as a center. Each rotor magnet 322 has a substantially rectangular shape extending along the radial direction in the plan view. The plan view is a shape of the object viewed from the upper side with a view line parallel to the central axis J1. The width of the outer surface of each core piece 321 in the circumferential direction is, for example, larger than the width of the outer surface of each rotor magnet 322 in the circumferential direction. The shapes of the core piece 321 and the rotor magnet 322 may be variously changed. The number of the core piece 321 and the rotor magnet 322 may be appropriately changed within a range of 2 or more, respectively.

In the rotor main body 32, a substantially cylindrical assembly is formed by the plurality of core pieces 321 and the plurality of rotor magnets 322. The outer surfaces of the plurality of core pieces 321 and the outer surfaces of the plurality of rotor magnets 322 are positioned at substantially the same position in the radial direction. In other words, the distance between the central axis J1 and the outer surface of each core piece 321 in the radial direction and the distance between the central axis J1 and the outer surface of each rotor magnet 322 in the radial direction are substantially the same. Accordingly, the leakage magnetic flux from the rotor magnet 322 can be reduced and the output of the motor 1 can increase. In addition, the inner ends of the plurality of rotor magnets 322 in the radial direction are closer to the shaft 31 than the inner ends of the plurality of core pieces 321 in the radial direction. In other words, the distance between the inner end in the radial direction of each rotor magnet 322 and the shaft 31 in the radial direction is smaller than the distance between the inner end in the radial direction of each core piece 321 and the shaft 31 in the radial direction. In other words, the inner ends of the plurality of rotor magnets 322 in the radial direction protrude inward from the inner surfaces of the plurality of core pieces 321 in the radial direction.

The upper end of each core piece 321 is positioned below the upper end of each rotor magnet 322. The lower end of each core piece 321 is positioned above the lower end of each rotor magnet 322. In other words, the upper end portion and the lower end portion of the plurality of rotor magnets 322 protrude from the upper end and the lower end of the plurality of core pieces 321 in the up and down direction.

The connection portion 323 is a substantially cylindrical portion which has the central axis J1 as a center. The connection portion 323 connects the shaft 31 to the plurality of core pieces 321 and the plurality of rotor magnets 322. The connection portion 323 is formed by filling a space between the shaft 31 and the plurality of core pieces 321 and the plurality of rotor magnets 322 with resin. In other words, the connection portion 323 fills the space between the shaft 31 and the plurality of core pieces 321 and the plurality of rotor magnets 322.

At the central portion of the upper end surface of the connection portion 323, a central protrusion portion 326 protruding upward from a region around the upper end surface is provided. The central protrusion portion 326 is a substantially cylindrical portion in contact with the outer surface of the shaft 31. The outer surface of the central protrusion portion 326 is an inclined surface facing inward in the radial direction as the outer surface thereof goes upward.

The connection portion 323 covers an outer surface of the shaft 31, an inner surface positioned inward of the surface of each of the respective core pieces 321 in the radial direction, an inner surface positioned inward of the surface of the rotor magnet 322 in the radial direction, and the inner end portions in the radial direction of both side surfaces of each of the rotor magnet 322 in the circumferential direction. A core recessed portion 324 recessed outward in the radial direction is provided on the inner surface of each core piece 321. In the vicinity of the inner surface of the core piece 321, the width of the core recessed portion 324 in the circumferential direction gradually increases as the core recessed portion goes farther outward from the inner surface of the core piece 321 in the radial direction. The maximum width of the core recessed portion 324 in the circumferential direction is larger than the width of the core recessed portion 324 in the circumferential direction on the inner surface of the core piece 321.

In the core recessed portion 324, the resin of the connection portion 323 is present. A portion of the connection portion 323 positioned in the core recessed portion 324 and a portion of the connection portion 323 positioned inward of the inner surface of the core piece 321 in the radial direction are continuous resin members which are connected to each other via the opening at the inner end of the core recessed portion 324 in the radial direction. The connection portion 323 also covers both end surfaces of the plurality of core pieces 321 and the plurality of rotor magnets 322 in the up and down direction.

Figure 5:
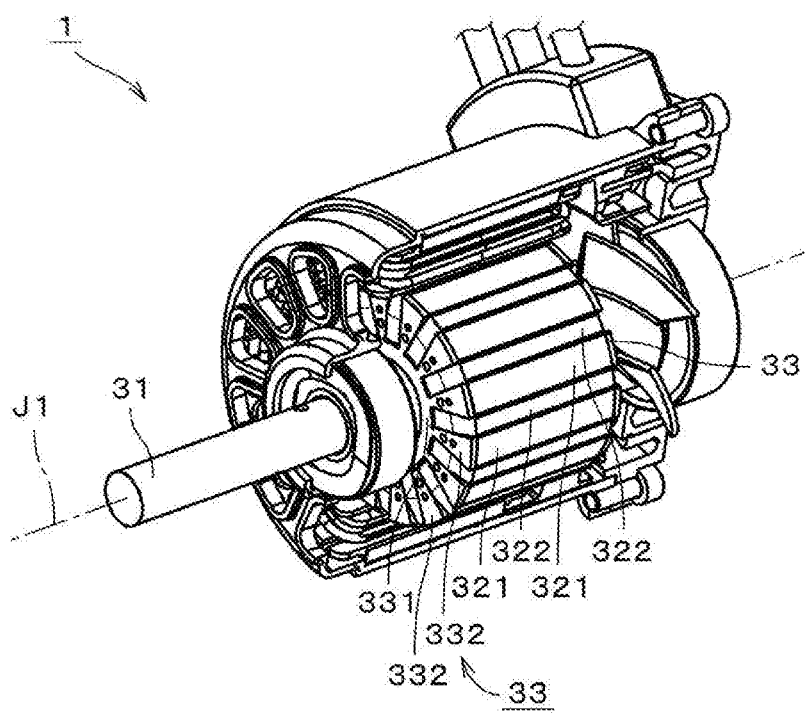
FIG. 5 is a perspective view illustrating an internal structure of a motor according to a preferred embodiment of the present invention by omitting a connection portion.

FIG. 5 is a perspective view of the motor 1 in which the connection portion 323 of FIG. 2 is not illustrated. Each connection plate portion 33 includes a first portion 331 and a plurality of second portions 332. The first portion 331 has a substantially annular shape which has the central axis J1 as a center. The plurality of second portions 332 extend radially outward from the outer peripheral edge of the first portion 331 in the radial direction. The plurality of second portions 332 are arranged at substantially equal angular intervals in the circumferential direction. The number of the plurality of second portions 332 is the same as the number of the plurality of core pieces 321. The shape of each second portion 332 in the plan view is substantially the same as the shape of the core piece 321 in the plan view.

The first portion 331 of the connection plate portion 33 is connected to the outer surface of the shaft 31 by press fitting or the like. The plurality of second portions 332 overlap the plurality of core pieces 321 in the up and down direction. Both end surfaces of each core piece 321 in the up and down direction are covered by the second portion 332 of the connection plate portion 33. The plurality of second portions 332 come in contact with the end surfaces of the plurality of core pieces 321 in the up and down direction and are connected to the plurality of core pieces 321. Accordingly, the plurality of core pieces 321 of the rotor main body 32 and the shaft 31 are connected, and the plurality of core pieces 321 are prevented from shifting with respect to the shaft 31 in the circumferential direction. The connection plate portion 33 and the plurality of core pieces 321 are connected to each other by inserting pins protruding from the end surfaces of the respective core pieces 321 in the up and down direction into the holes provided in the respective second portions 332 of the connection plate portion 33. In the example illustrated in FIG. 4, among the two connection plate portions 33, only the lower connection plate portion 33 is directly connected to the outer surface of the shaft 31, and the upper connection plate portion 33 is slightly spaced from the outer surface of the shaft 31.

Both end surfaces of the plurality of rotor magnets 322 in the up and down direction are positioned between the plurality of second portions 332 in the circumferential direction. In other words, both end surfaces of each rotor magnet 322 in the up and down direction are not substantially covered by the connection plate portion 33, but are exposed from between the two second portions 332 adjacent in the circumferential direction. The upper end of each rotor magnet 322 is positioned at substantially the same position in the up and down direction as the upper end surface of each second portion 332 of the upper connection plate portion 33. The lower end of each rotor magnet 322 is positioned at substantially the same position in the up and down direction as the lower end surface of each second portion 332 of the lower connection plate portion 33.

As illustrated in FIGS. 2 and 4, the connection portion 323 of the rotor main body 32 covers the both end surfaces of a plurality of core pieces 321 and a plurality of rotor magnets 322 from above the connection plate portion 33 on both sides of the plurality of core pieces 321 and the plurality of rotor magnets 322 in the up and down direction. Since the end surface of each core piece 321 in the up and down direction is covered by the connection plate portion 33 as described above, the connection portion 323 indirectly come in contact with the end surface of each core piece 321 in the up and down direction via the connection plate portion 33. In addition, the connection portion 323 directly come in contact with the end surfaces of each of the rotor magnets 322 in the up and down direction without going via the connection plate portion 33.

Figure 6:
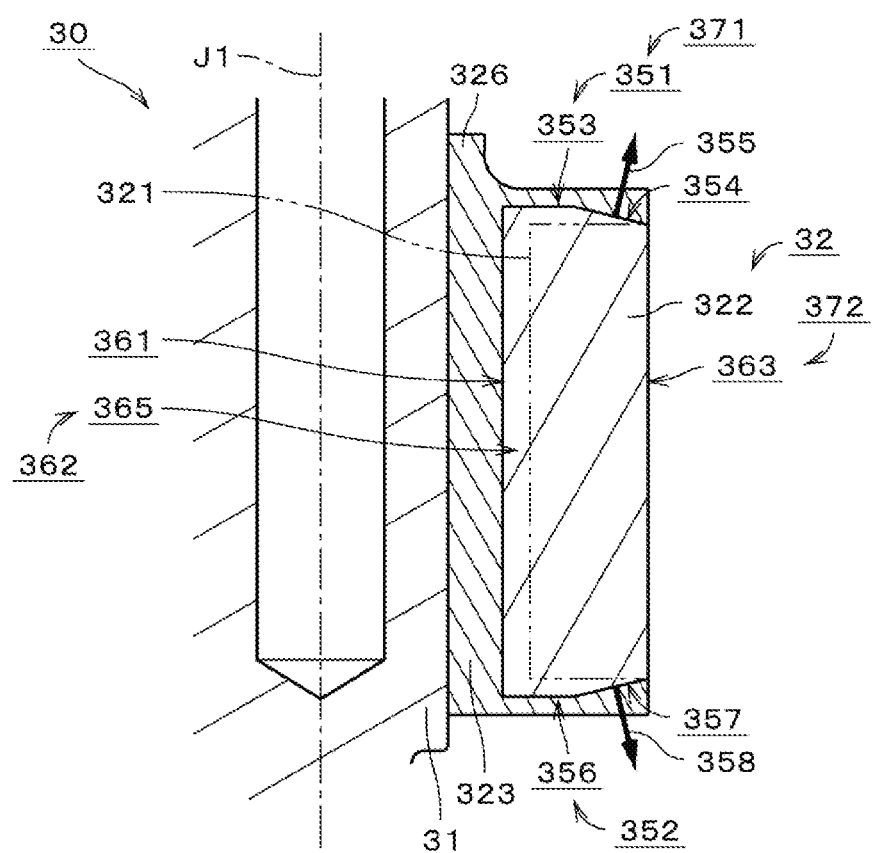
FIG. 6 is a longitudinal sectional view illustrating a rotor magnet according to a preferred embodiment of the present invention.
Figure 7:
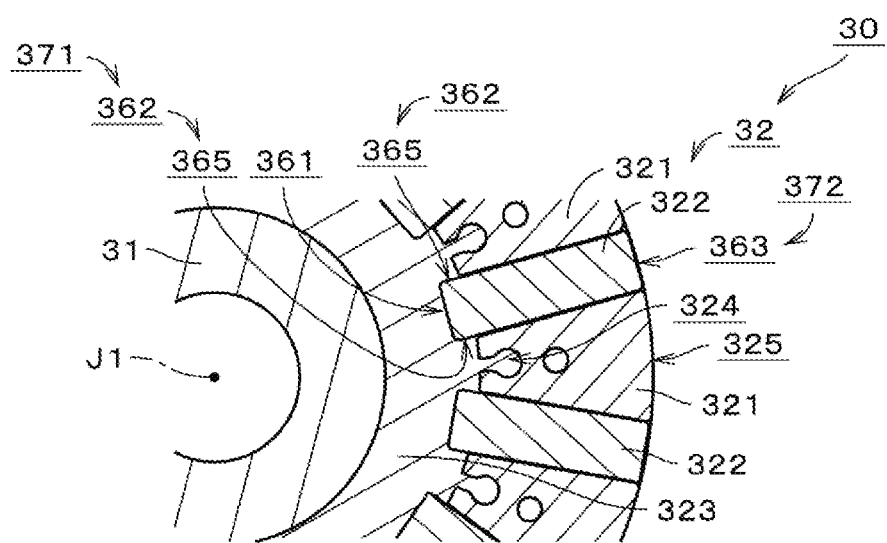
FIG. 7 is a transverse sectional view illustrating a rotor magnet according to a preferred embodiment of the present invention.

FIG. 6 is an enlarged longitudinal transverse sectional view illustrating one rotor magnet 322 and vicinity thereof. In addition, in FIG. 6, a core piece 321 adjacent to the rotor magnet 322 is indicated by a two-dot chain line. FIG. 7 is an enlarged transverse sectional view illustrating the rotor magnet 322 and vicinity thereof. The shapes and structures of other rotor magnets 322 and vicinities thereof are substantially the same as those illustrated in FIGS. 6 and 7.

Among the surfaces of the rotor magnet 322, the upper end surface 351 and the lower end surface 352 are covered by the connection portion 323 over substantially the entire surface. In addition, among the surfaces of the rotor magnet 322, the inner surface 361 positioned inward in the radial direction is also covered by the connection portion 323 over substantially the entire surface. On the side surfaces 362 on both sides of the rotor magnet 322 in the circumferential direction, the region 365 of the inner end in the radial direction continuous from the inner surface 361 is covered by the connection portion 323, and the region other than the region 365 is covered by the adjacent core piece 321 in the circumferential direction. In the following description, the region 365 is referred to as "side surface inner end region 365". The outer surface 363 of the surfaces of rotor magnet 322 positioned outward in the radial direction is not covered by the connection portion 323, the core piece 321 and the like over substantially the entire surface, but is exposed from the connection portion 323 and the core piece 321. In other words, the outer surface 363 of the rotor magnet 322 is a portion of the outer surface of the rotor main body 32.

In the following description, among the surface of the rotor magnet 322, a region covered by the connection portion 323 is referred to as an "engagement region 371", and a region exposed from the connection portion 323 is referred to as an "exposed region 372". The engagement region 371 includes a side surface inner end region 365 of an upper end surface 351, a lower end surface 352, an inner surface 361, and side surfaces 362 on both ends of the rotor magnet 322. The exposed region 372 includes the outer surface 363 of the rotor magnet 322.

The upper end surface 351 of the rotor magnet 322 includes a first region 353 and a second region 354. The first region 353 is positioned inward in the radial direction on the upper end surface 351. The inner end of the first region 353 in the radial direction is, for example, the inner end of the upper end surface 351 in the radial direction. The second region 354 is continuous with the outer end of the first region 353 in the radial direction. The second region 354 extends outward in the radial direction from the outer end of the first region 353 in the radial direction. The outer end of the second region 354 in the radial direction is, for example, the outer end of the upper end surface 351 in the radial direction. The outer end of the second region 354 in the radial direction is an end positioned on the side opposite to the first region 353 in the second region 354. The radial outer end of the second region 354 may be positioned inward in the radial direction of the outer end of the upper end surface 351 in the radial direction.

The outer end of the second region 354 in the radial direction is positioned below the first region 353. In other words, the outer end of the second region 354 in the radial direction is closer to the lower end surface 352 of the rotor magnet 322 than the first region 353. The second region 354 approaches the lower end surface 352 of the rotor magnet 322 as the second region moves away from the outer end of the first region 353 in the radial direction. In an example illustrated in FIG. 6, the second region 354 is an inclined surface which gradually approaches the lower end surface 352 in the up and down direction as the second region moves away from the first region 353 outward in the radial direction. The second region 354 is a flat surface in which the inclination angle with respect to the horizontal plane is substantially constant over substantially the entire length in the radial direction. In addition, the first region 353 is a plane substantially vertical to the up and down direction.

In FIG. 6, a normal vector 355 of the second region 354 is indicated by thick arrow. The normal vector 355 of the second region 354 has a component facing outward in the radial direction. In other words, the second region 354 is positioned at the same position in the up and down direction as a portion covering the second region 354 of the connection portion 323, and faces in the radial direction. In other words, the second region 354 of the upper end surface 351 is an engagement surface that engages in the radial direction with a portion of the connection portion 323 covering the second region 354.

Similarly to the upper end surface 351, the lower end surface 352 of the rotor magnet 322 includes a first region 356 and a second region 357. The first region 356 is positioned inward in the radial direction on the lower end surface 352. The inner end of the first region 356 in the radial direction is, for example, the inner end of the lower end surface 352 in the radial direction. The second region 357 is continuous with the outer end of the first region 356 in the radial direction. The second region 357 extends outward in the radial direction from the outer end of the first region 356 in the radial direction. The outer end of the second region 357 in the radial direction is, for example, an outer end of the lower end surface 352 in the radial direction. The outer end of the second region 357 in the radial direction is an end positioned on the side opposite to the first region 356 in the second region 357. The outer end of the second region 357 in the radial direction may be positioned inward in the radial direction of the outer end of the lower end surface 352 in the radial direction.

The outer end of the second region 357 in the radial direction is positioned above the first region 356. In other words, the outer end of the second region 357 in the radial direction is closer to the upper end surface 351 of the rotor magnet 322 than the first region 356. The second region 357 approaches the upper end surface 351 of the rotor magnet 322 as the second region moves away from the outer end of the first region 356 in the radial direction. In an example illustrated in FIG. 6, the second region 357 is an inclined surface which gradually approaches the upper end surface 351 in the up and down direction as the second region goes outward in the radial direction from the first region 356. The second region 357 is a flat surface in which the inclination angle with respect to the horizontal plane is substantially constant over almost the entire length in the radial direction. In addition, the first region 356 is a flat surface substantially perpendicular in the up and down direction.

In FIG. 6, a normal vector 358 of the second region 357 is indicated by thick arrow. The normal vector 358 of the second region 357 has a component facing outward in the radial direction. In other words, the second region 357 is positioned at the same position in the up and down direction as a portion covering the second region 357 of the connection portion 323, and faces the portion in the radial direction. In other words, the second region 357 of the lower end surface 352 is an engagement surface that engages in a radial direction with a portion of the connection portion 323 covering the second region 357.

Figure 8:
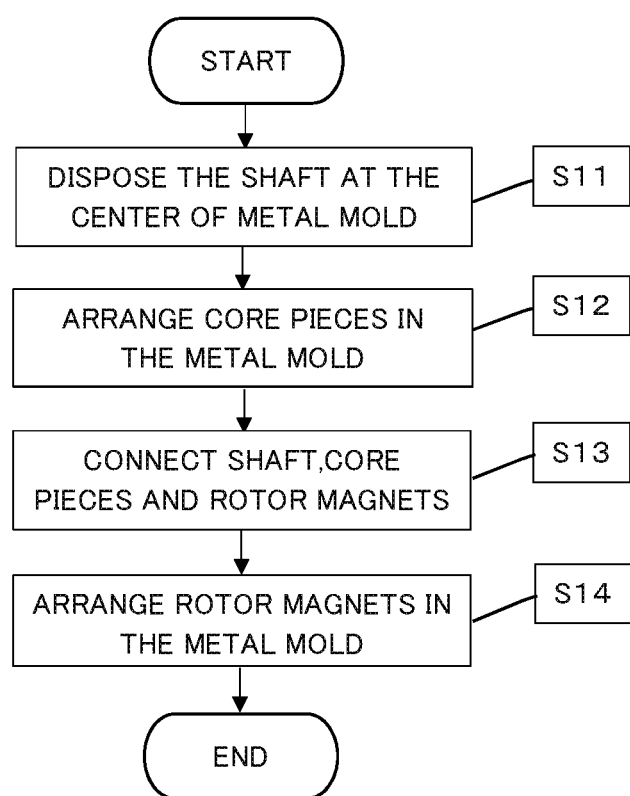
FIG. 8 is a view illustrating a flow of manufacturing a rotor assembly according to a preferred embodiment of the present invention.
Figure 9:
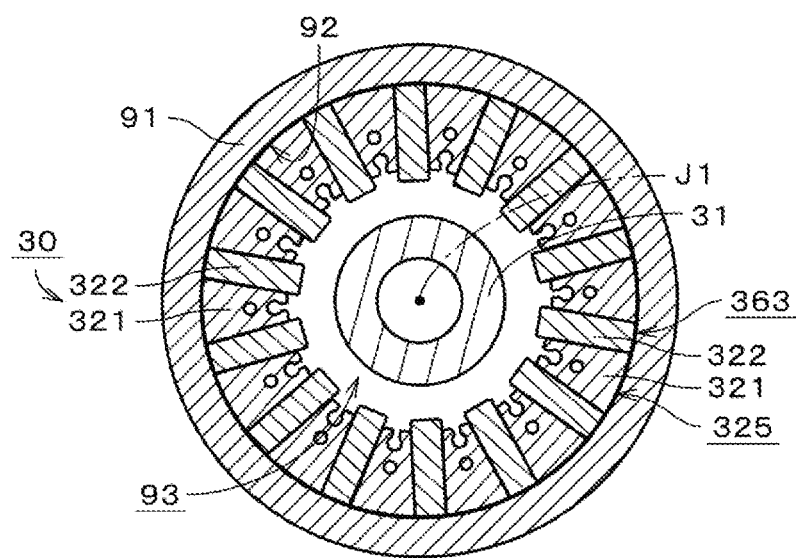
FIG. 9 is a transverse sectional view illustrating a rotor assembly according to a preferred embodiment of the present invention in the course of manufacture.
Figure 10:
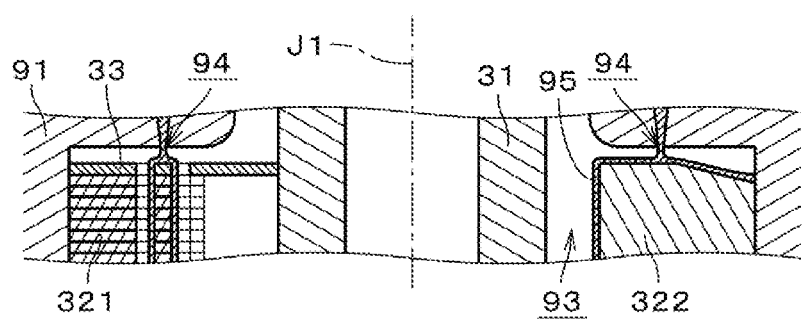
FIG. 10 is a longitudinal sectional view illustrating a rotor assembly according to a preferred embodiment of the present invention in the course of manufacture.

FIG. 8 is a view illustrating a flow of manufacturing the rotor assembly 30. FIG. 9 is a transverse sectional view illustrating the rotor assembly 30 in the process of manufacture. FIG. 10 is a longitudinal sectional view illustrating a portion of the rotor assembly 30 in the process of manufacture. In FIGS. 9 and 10, the metal mold 91 used for manufacturing the rotor assembly 30 is also illustrated. FIG. 9 illustrates the state before Step S14 is completed after steps S11 to S13 to be described below are completed. FIG. 10 illustrates a state where step S14 is being performed.

When the rotor assembly 30 is manufactured, first, the shaft 31 made of a non-magnetic material is disposed at the center of a substantially cylindrical magnetic metal mold 91 (step S11). The inner surface 92 of the metal mold 91 is a substantially cylindrical surface which has the central axis as a center. The central axis of the inner surface 92 of the metal mold 91 coincides with the central axis J1 of the motor 1 described above.

Subsequently, the plurality of core pieces 321 are arranged in the circumferential direction around the shaft 31 in the metal mold 91 (step S12). For example, the plurality of core pieces 321 are handled in a state where the upper end surface and the lower end surface are connected by the connection plate portion (see FIG. 5). In step S12, the plurality of core pieces 321 are disposed away from the shaft 31 outward in the radial direction. In addition, the outer surface 325 of the plurality of core pieces 321 abuts against the inner surface 92 of the metal mold 91.

Next, the plurality of rotor magnets 322 are alternately arranged in the circumferential direction with the plurality of core pieces 321 around the shaft 31 in the metal mold 91 (step S13). In step S13, the plurality of rotor magnets 322 are disposed away from the shaft 31 outward in the radial direction. In addition, the outer surfaces 363 of the plurality of rotor magnets 322 abut against the inner surface 92 of the metal mold 91. As illustrated in FIG. 9, the inner ends of the plurality of rotor magnets 322 in the radial direction are closer to the shaft 31 than the inner ends of the plurality of core pieces 321 in the radial direction. In addition, the first regions 353 and 356 (see FIG. 6) of the upper end surface 351 and the lower end surface 352 of each rotor magnet 322 are positioned substantially at the same positions in the up and down direction with the end surfaces of the upper and lower connection plate portions 33.

In steps S12 and S13, a plurality of rotor magnets 322 and a plurality of core pieces 321 alternately arranged in the circumferential direction are coupled by the magnetic force of the rotor magnet 322. In addition, the outer surface 363 of the plurality of rotor magnets 322 and the outer surface 325 of the plurality of core pieces 321 are attracted to and abut against the inner surface 92 of the metal mold 91 by the magnetic force of the rotor magnet 322. Step S13 may be performed before step S12. Alternatively, step S12 and step S13 may be performed in parallel.

When steps S11 to S13 are completed, as illustrated in FIG. 10, the resin 95 is poured into the metal mold 91 from a plurality of gates 94 provided on the upper portion of the metal mold 91. The gate 94 faces the connection plate portion 33 and the core piece 321 illustrated on the left side in FIG. 10 and the rotor magnet 322 illustrated on the right side of FIG. 10 in the up and down direction via a gap. The resin 95 poured into the metal mold 91 from the gate 94 is filled in a space 93 between the shaft 31 and the plurality of core pieces 321 and the plurality of rotor magnets 322. The connection portion 323 is formed by hardening the resin 95, and the shaft 31, the plurality of core pieces 321, and the plurality of rotor magnets 322 are connected by the connection portion 323 (step S14). In addition, the connection portion 323 also covers both upper end surfaces of the plurality of core pieces 321 and the plurality of rotor magnets 322 in the up and down direction, and the connection plate portion 33. Then, when the metal mold 91 is removed, the manufacture of the rotor assembly 30 is completed. In step S14, in a case where there is a gap between the core piece 321 and the rotor magnet 322 that are adjacent in the circumferential direction, the gap may also be filled with resin.

In the example illustrated in FIG. 4, the rotor fan 34 is fixed to the shaft 31 on the upper side of the rotor main body 32. The first bearing 41 is positioned above the rotor fan 34. In other words, the rotor fan 34 is positioned between the first bearing 41 and the rotor main body 32 in the up and down direction. The rotor fan 34 faces the first bearing 41 and the rotor main body 32 in the up and down direction. The outer diameter of the rotor fan 34 is larger than the outer diameter of the first bearing 41 and larger than the outer diameter of the lower end portion of the bearing holding portion 214. In addition, the outer diameter of the rotor fan 34 is substantially equal to the outer diameter of the rotor main body 32. The outer diameter of the rotor fan 34 is twice the distance between an outermost edge of a blade 342 (described below) and the central axis J1 of the rotor fan 34 in the radial direction.

The rotor fan 34 is a substantially annular member surrounding the periphery of the shaft 31. The rotor fan 34 is, for example, a diagonal flow fan or a centrifugal fan. The rotor fan 34 includes a fan base portion 341 and a plurality of blades 342. The fan base portion 341 is a substantially annular portion which has the central axis J1 as a center. The fan base portion 341 is connected to the outer surface of the shaft 31 by press fitting or the like. The plurality of blades 342 are connected to the fan base portion 341. The plurality of blades 342 are arranged at substantially equal angular intervals in the circumferential direction.

The armature 22 faces the rotor main body 32 in the radial direction. The armature 22 includes a core back portion 221, a plurality of teeth 222, an insulator 223, and a plurality of coils 224. The core back portion 221 is a substantially cylindrical portion which has the central axis J1 as a center. The core back portion 221 is fixed to the inner surface of the side wall portion 211 of the housing 21. The plurality of teeth 222 extend radially inward from the core back portion 221 in the radial direction. The plurality of teeth 222 are arranged at substantially equal angular intervals in the circumferential direction. The core back portion 221 and the plurality of teeth 222 are, for example, members made of magnetic metal which are connected. The insulator 223 is an insulating body covering the surfaces of the plurality of teeth 222. The plurality of coils 224 are formed by winding a conductive wire from above the insulator 223 to the plurality of teeth 222. In the present embodiment, the plurality of coils 224 are three-phase coils.

The plurality of coils 224 are electrically connected to a plurality of bus bars 23 arranged above the armature 22. In the example illustrated in FIG. 4, the number of bus bars 23 is three. Each bus bar 23 is a conductive member. Each bus bar 23 is a substantially annular or substantially arcuate member which has the central axis J1 as a center. The plurality of bus bars 23 include a U-phase bus bar, a V-phase bus bar, and a W-phase bus bar. The U-phase bus bar connects the plurality of U-phase coils 224 among the plurality of coils 224 to each other. The V-phase bus bar connects the plurality of V-phase coils 224 among the plurality of coils 224 to each other. The W phase bus bar connects the plurality of W phase coils 224 among the plurality of coils 224 to each other. The plurality of bus bars 23 electrically connect the plurality of coils 224 of the armature 22 to an external power supply (not illustrated).

The plurality of bus bars 23 are held by the bus bar holding portion 24. The bus bar holding portion 24 is a substantially cylindrical member which has the central axis J1 as a center. The bus bar holding portion 24 is an insulating member. The bus bar holding portion 24 is arranged on the upper side of the armature 22 and faces the armature 22 in the up and down direction. In addition, the bus bar holding portion 24 is disposed outward of the rotor fan 34 in the radial direction and faces the rotor fan 34 in the radial direction. The bus bar holding portion 24 is fixed to the housing 21 or the armature 22, for example.

The bus bar holding portion 24 includes an inner cylindrical portion 241, a flange portion 242, and an outer cylindrical portion 243. The inner cylindrical portion 241 is a substantially cylindrical portion which has the central axis J1 as a center. The flange portion 242 is a substantially annular portion extending outward from the lower end portion of the inner cylindrical portion 241 in the radial direction. In the example illustrated in FIG. 4, the flange portion 242 faces downward as the flange portion goes outward in the radial direction. The outer cylindrical portion 243 faces downward from the outer end portion of the flange portion 242. The outer cylindrical portion 243 is a substantially cylindrical portion about the central axis J1. The inner cylindrical portion 241, the flange portion 242, and the outer cylindrical portion 243 are, for example, members made of resin which are connected.

In the bus bar holding portion 24, the outer surface of the outer cylindrical portion 243 comes in contact with the inner surface of the side wall portion 211 of the housing 21. The lower end portion of the outer cylindrical portion 243 comes in contact with the upper end portion of the core back portion 221 of the armature 22. The flange portion 242 is provided with a plurality of groove portions 244 opening upward. Each of the groove portions 244 is substantially annular or substantially arcuate which has the central axis J1 as a center. In each groove portion 244, the bus bar 23 is accommodated and fixed. In the example illustrated in FIG. 4, three bus bars 23 are fixed to the three groove portions 244 of the bus bar holding portion 24. The number of the bus bars 23 held by the bus bar holding portion 24 may be 1, or 2 or more. In addition, the bus bar 23 in the groove portion 244 may be molded with resin.

The bus bar holding portion 24 is a substantially cylindrical wind tunnel portion disposed outside the rotor fan 34 in the radial direction. The inner surface 245 of the inner cylindrical portion 241 of the bus bar holding portion 24 is substantially cylindrical which has the central axis J1 as a center. The inner surface 245 of the bus bar holding portion 24 faces the rotor fan 34 in the radial direction. The inner surface 245 of the bus bar holding portion 24 is positioned outward in the radial direction the outer edge of each blade 342 of the rotor fan 34 in the radial direction and is close to the outer edge of each blade 342 in the radial direction. The inner surface 245 of the bus bar holding portion 24 faces each blade 342 in the radial direction over substantially the entire length of each blade 342 in the up and down direction. The upper end of the inner surface 245 of the bus bar holding portion 24 is positioned above the upper ends of each blade 342 of the rotor fan 34.

The upper end portion of the inner surface 245 of the bus bar holding portion 24 faces the outer surface 217 of the bearing holding portion 214 in the radial direction. The outer surface 217 of the bearing holding portion 214 is an inclined surface that faces inward in the radial direction as outer surface goes downward. The outer surface 217 of the bearing holding portion 214 is, for example, a side surface of a substantially truncated cone. The outer surface 217 of the bearing holding portion 214 is positioned at substantially the same position in the up and down direction as each first opening 215 of the housing 21. In other words, each of the first openings 215 faces the outer surface 217 of the bearing holding portion 214 in the radial direction.

The lower surface 246 of the flange portion 242 of the bus bar holding portion 24 is a substantially annular surface which has the central axis J1 as a center. The lower surface 246 of the flange portion 242 extends outward from the lower end of the inner surface 245 of the inner cylindrical portion 241 in the radial direction. The lower surface 246 of the flange portion 242 is an inclined surface facing downward as the lower surface thereof faces outward from the lower end of the inner surface 245 in the radial direction. The lower surface 246 of the flange portion 242 is positioned between the armature 22 and the bus bar 23 which are arranged in the up and down direction. The lower surface 246 of the flange portion 242 faces the armature 22 in the up and down direction.

In the motor 1, a current is supplied to the coil 224 of the armature 22 via the bus bar 23, so that a torque is generated between the coil 224 and the rotor main body 32. Accordingly, the rotation portion 3, that is, the rotor assembly 30 and the rotor fan 34 rotate about the central axis J1 in the circumferential direction.

In the motor 1, when the plurality of blades 342 of the rotor fan 34 rotate in the circumferential direction, the flow of the air from the first opening 215 to the second opening 216 via the armature 22 and vicinity thereof is formed in the motor 1. In the motor 1, by rotating the rotor fan 34 in the direction opposite to the above, the flow of the air from the second opening 216 to the first opening 215 via the armature 22 and vicinity thereof may be formed in the motor 1. In either case, due to the air flow, the internal structure of the motor 1, in particular the armature 22, is cooled.

Hereinafter, the cooling by the rotor fan 34 will be described more specifically. In the motor 1, as the plurality of blades 342 of the rotor fan 34 rotate in the counterclockwise direction in the plan view, the air above the rotor fan 34 flows downward, and flows into the interior of the inner cylindrical portion 241 via the upper end opening in the inner cylindrical portion 241 of the bus bar holding portion 24. As a result, the air outside the housing 21 flows into the housing 21 via the plurality of first openings 215, and flows downward toward the rotor fan 34 rotating inside the inner cylindrical portion 241.

The inner cylindrical portion 241 rectifies the flow of air flowing into the rotor fan 34 and the flow of air sent out from the rotor fan 34 in a direction parallel to the central axis J1. Accordingly, the blowing efficiency by the rotor fan 34 can be improved. The air that passes through the inner cylindrical portion 241 and flows out downward from the lower end opening of the inner cylindrical portion 241 expands outward in the radial direction along the lower surface 246 of the flange portion 242 and the outer surface of the central protrusion portion 326 of the connection portion 323 and flows downward toward the armature 22. The air passes downward through the gap between the coil 224 of the armature 22 and the gap between the armature 22 and the rotor main body 32, flows downward, and flows out of the housing 21 via the plurality of second openings 216.

Accordingly, as described above, a flow of air from the first opening 215 to the second opening 216 via the armature 22 and the vicinity thereof is formed inside the motor 1. As a result, the internal structure of the motor 1, particularly the armature 22, is cooled. The first opening 215 is an inlet through which air flows into the interior of the motor 1 and the second opening 216 is an outlet through which air inside the motor 1 flows out.

On the other hand, in a case where the plurality of blades 342 of the rotor fan 34 rotate in the clockwise direction in the plan view, a flow of air from the second opening 216 to the first opening 215 via the armature 22 and the vicinity thereof is formed in the motor 1. As a result, the internal structure of the motor 1, particularly the armature 22, is cooled in the same manner as described above. In this case, the second opening 216 is an inlet through which air flows into the motor 1, and the first opening 215 is an outlet through which air inside the motor 1 flows out.

As described above, the motor 1 includes the shaft 31, the bearing mechanism 4, the cylindrical rotor main body 32, the rotor fan 34, the armature 22, and the housing 21. The shaft 31 has the central axis J1 along the up and down direction as a center. The bearing mechanism 4 rotatably supports the shaft 31. The rotor main body 32 is fixed to the shaft 31. The rotor fan 34 is fixed to the shaft 31 at the upper side of the rotor main body 32. The armature 22 faces the rotor main body 32 in the radial direction. The housing 21 accommodates the rotor main body 32, the rotor fan 34, and the armature 22 therein.

The bearing mechanism 4 includes a first bearing 41 and a second bearing 42. The first bearing 41 is positioned above the rotor fan 34 in the housing 21 and faces the rotor fan 34 in the up and down direction. The second bearing 42 is positioned below the rotor main body 32. The housing 21 includes a first opening 215, a second opening 216, and a bearing holding portion 214. The first opening 215 is positioned above the armature 22. The second opening 216 is positioned below the armature 22. The bearing holding portion 214 holds the first bearing 41 by coming in contact with the outer surface of the first bearing 41. The outer surface 217 of the bearing holding portion 214 faces inward in the radial direction as the outer surface goes downward.

In the motor 1, in a case where the first opening 215 is an air inlet port, the air flowing into the housing 21 from the first opening 215 flows along the outer surface 217 of the bearing holding portion 214, and is guided efficiently to the rotor fan 34. In addition, when the first opening 215 is an air outlet port, the air sent out upward from the rotor fan 34 flows along the outer surface 217 of the bearing holding portion 214 and is efficiently guided to the first opening 215. In other words, in the motor 1, since the air flow between the rotor fan 34 and the first opening 215 is guided along the outer surface 217 of the bearing holding portion 214, the flow rate of the air flow can efficiently increase. As a result, it is possible to efficiently cool the inside of the housing 21 of the motor 1.

In the motor 1, the first opening 215 is positioned on the outer surface of the housing 21. Accordingly, inclination of the outer surface 217 of the bearing holding portion 214 can be used for increasing the flow rate of the air flow between the rotor fan 34 and the first opening 215. In addition, the first opening 215 faces the outer surface 217 of the bearing holding portion 214 in the radial direction. Accordingly, the inclination of the outer surface 217 of the bearing holding portion 214 can be more suitably used for increasing the flow rate of the air flow between the rotor fan 34 and the first opening 215.

As described above, the outer diameter of the rotor fan is larger than the outer diameter of the first bearing 41. Accordingly, in a case where the first opening 215 is an air inlet port, the air flowing along the outer surface 217 of the bearing holding portion 214 is directly guided to the rotor fan 34 without colliding with another structure. In the case where the first opening 215 is an air outlet port, the air sent out upward from the rotor fan 34 comes in direct contact with the outer surface 217 of the bearing holding portion 214 without colliding with another structure. Therefore, the inclination of the outer surface 217 of the bearing holding portion 214 can be suitably used for increasing the flow rate of the air flow between the rotor fan 34 and the first opening 215.

As described above, the outer diameter of the rotor fan is equal to the outer diameter of the rotor main body 32. Accordingly, when manufacturing the motor 1, the rotor main body 32 and the rotor fan 34 fixed to the shaft 31 can be inserted into either the armature 22 from either in the up and down directions. Accordingly, it is possible to improve the degree of freedom of assembling the motor 1 at the time of manufacturing the motor 1.

The motor 1 further includes a bus bar 23 and a bus bar holding portion 24. The bus bar 23 electrically connects the armature 22 to an external power supply. The bus bar holding portion 24 holds the bus bar 23. The bus bar holding portion 24 includes a cylindrical inner surface 245 which has the central axis J1 as a center. The inner surface 245 of the bus bar holding portion 24 faces the rotor fan 34 in the radial direction. In the motor 1, the inner surface 245 of the bus bar holding portion 24 can improve air blowing efficiency by the rotor fan 34 by acting as a wind tunnel portion surrounding the rotor fan 34. In addition, by using the bus bar holding portion 24 for holding the bus bar 23 also as the wind tunnel portion of the rotor fan 34, the structure of the motor 1 can be simplified and the size of the motor 1 can be reduced.

Further, in the motor 1, the upper end portion of the inner surface 245 of the bus bar holding portion 24 and the outer surface 217 of the bearing holding portion 214 faces each other in the radial direction. Accordingly, in a case where the first opening 215 is an air inlet port, diffusion of air flowing along the outer surface 217 of the bearing holding portion 214 outward in the radial direction is suppressed by the bus bar holding portion 24, and the air is efficiently guided to the rotor fan 34. In addition, in a case where the first opening 215 is an air outlet port, diffusion of the air sent out upward from the rotor fan 34 in the radial direction is suppressed by the bus bar holding portion 24, and the air is efficiently guided the outer surface 217 of the bearing holding portion 214. Therefore, the inclination of the outer surface 217 of the bearing holding portion 214 can be more suitably used for increasing the flow rate of the air flow between the rotor fan 34 and the first opening 215. As a result, it is possible to further improve the air blowing efficiency by the rotor fan 34.

In the rotor assembly 30 and the motor 1 described above, various modifications are possible.

For example, the upper end portion of the inner surface 245 of the bus bar holding portion 24 is not necessarily required to face the outer surface 217 of the bearing holding portion 214 in the radial direction, but may be positioned below the lower end portion of the bearing holding portion 214.

The lower surface 246 of the bus bar holding portion 24 is not necessarily required to go downward as the lower surface goes outward from the lower end of the inner surface 245 in the radial direction but may be substantially perpendicular to the central axis J1, for example. In addition, the lower surface 246 of the bus bar holding portion 24 is not necessarily required to face the armature 22 in the up and down direction.

In the motor 1, as the wind tunnel portion surrounding the rotor fan 34, a member different from the bus bar holding portion 24 may be provided. The bus bar 23 and the bus bar holding portion 24 may be omitted. In addition, the wind tunnel portion surrounding the rotor fan 34 may be also omitted.

The outer diameter of the rotor fan 34 may be smaller or larger than the outer diameter of the rotor main body 32. In addition, the outer diameter of the rotor fan 34 may be equal to the outer diameter of the first bearing 41 or may be smaller than the outer diameter of the first bearing 41.

The position of the first opening 215 may be appropriately changed on the upper side of the armature 22. For example, the first opening 215 is not necessarily required to face the outer surface 217 of the bearing holding portion 214 in the radial direction, and may be disposed at a position different from the bearing holding portion 214 in the up and down direction in the side wall portion 211 of the housing 21. Alternatively, the first opening 215 may be disposed in the canopy portion 213 of the housing 21 instead of the side wall portion 211 of the housing 21.

The position of the second opening 216 may be appropriately changed on the lower side than the armature 22. For example, the second opening 216 may be disposed in the side wall portion 211 of the housing 21 instead of the bottom portion 212 of the housing 21.

In the rotor assembly 30, substantially the entire outer surface 363 of each rotor magnet 322 may be exposed from the connection portion 323. In other words, substantially the entire outer surface 363 may be included in the exposed region 372. For example, in a case where a chamfering process is performed on the side edge portion of the outer surface 363 in the circumferential direction, a notch or the like formed by the chamfering process is covered by a resin and the upper and lower connection portions 323 of the rotor magnet 322 may be connected by the resin.

Figure 11:
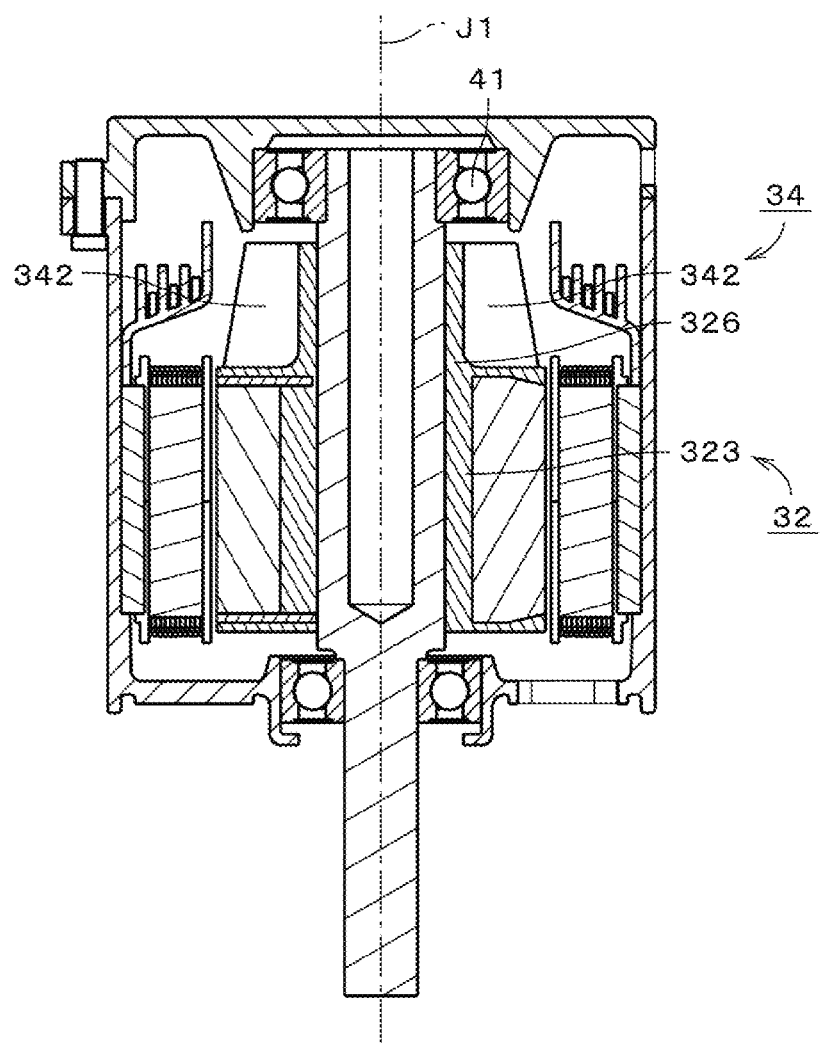
FIG. 11 is a longitudinal sectional view of another motor according to a preferred embodiment of the present invention.

The shape, structure and material of each configuration of the motor 1 may be variously changed. For example, as illustrated in FIG. 11, the rotor fan 34 may be a member connected to the rotor main body 32. In the example illustrated in FIG. 11, the central protrusion portion 326 of the connection portion 323 extends to the vicinity of the first bearing 41, and the plurality of blades 342 are connected to the outer surface of the central protrusion portion 326, whereby the rotor fan 34 are formed.

The motor 1 is not necessarily limited to a three-phase motor, and may be various types of motors. The motor 1 may be used for various devices other than the axial flow fan.

The motor according to the present disclosure can be used as a motor for various purposes. The motor is preferably used for an axial flow fan.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A motor comprising:
a shaft that has a central axis along an up and down direction as a center;
a bearing mechanism that rotatably supports the shaft;
a cylindrical rotor main body that is fixed to the shaft;
a rotor fan that is fixed to the shaft at an upper side of the rotor main body;
an armature that faces the rotor main body in a radial direction; and
a housing that accommodates the rotor main body, the rotor fan, and the armature therein; wherein
the bearing mechanism includes:
a first bearing that is positioned above the rotor fan in the housing and faces the rotor fan in the up and down direction; and
a second bearing that is positioned below the rotor main body;
the housing includes:
a first opening that is positioned above the armature;
a second opening that is positioned below the armature; and
a bearing holding portion that holds the first bearing by coming in contact with an outer surface of the first bearing;
an outer surface of the bearing holding portion faces inward in the radial direction as the outer surface extends downward; and
a lower end of the outer surface of the bearing holding portion is vertically above an upper end of the rotor fan.
2. The motor according to claim 1, wherein the first opening is positioned on an outer surface of the housing.
3. The motor according to claim 1, wherein an outer diameter of the rotor fan is larger than an outer diameter of the first bearing.
4. The motor according to claim 1, wherein an outer diameter of the rotor fan is equal or substantially equal to an outer diameter of the rotor main body.
5. A motor comprising:
a shaft that has a central axis along an up and down direction as a center;
a bearing mechanism that rotatably supports the shaft;
a cylindrical rotor main body that is fixed to the shaft;
a rotor fan that is fixed to the shaft at an upper side of the rotor main body;
an armature that faces the rotor main body in a radial direction;
a housing that accommodates the rotor main body, the rotor fan, and the armature therein;
a bus bar that electrically connects the armature to an external power supply; and
a bus bar holding portion that holds the bus bar; wherein
the bearing mechanism includes:

a first bearing that is positioned above the rotor fan in the housing and faces the rotor fan in the up and down direction; and a second bearing that is positioned below the rotor main body;

the housing includes:

a first opening that is positioned above the armature;

a second opening that is positioned below the armature; and a bearing holding portion that holds the first bearing by coming in contact with an outer surface of the first bearing;

an outer surface of the bearing holding portion faces inward in the radial direction as the outer surface of the bearing holding portion extends downward;

the bus bar holding portion includes a cylindrical inner surface that has the central axis as its center; and the inner surface of the bus bar holding portion faces the rotor fan in the radial direction.

6. The motor according to claim 5, wherein an upper end portion of the inner surface of the bus bar holding portion and the outer surface of the bearing holding portion face each other in the radial direction.

7. The motor according to claim 5, wherein the first opening is positioned on an outer surface of the housing.

8. The motor according to claim 7, wherein the first opening faces the outer surface of the bearing holding portion in the radial direction.

9. The motor according to claim 5, wherein an outer diameter of the rotor fan is larger than an outer diameter of the first bearing.

10. The motor according to claim 5, wherein an outer diameter of the rotor fan is equal or substantially equal to an outer diameter of the rotor main body.

* * * * *